United States Patent
Mizushita

(10) Patent No.: US 11,777,383 B2
(45) Date of Patent: Oct. 3, 2023

(54) METHOD FOR MANUFACTURING VARIABLE SPEED ACCELERATOR AND METHOD FOR CONNECTING SHAFT JIG

(71) Applicant: MITSUBISHI HEAVY INDUSTRIES COMPRESSOR CORPORATION, Tokyo (JP)

(72) Inventor: Koichi Mizushita, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 737 days.

(21) Appl. No.: 16/690,774

(22) Filed: Nov. 21, 2019

(65) Prior Publication Data

US 2020/0169150 A1    May 28, 2020

(30) Foreign Application Priority Data

Nov. 26, 2018 (JP) ................. 2018-220623

(51) Int. Cl.
*H02K 15/02*  (2006.01)
*H02K 15/14*  (2006.01)
(Continued)

(52) U.S. Cl.
CPC ............ *H02K 15/028* (2013.01); *F16H 1/28* (2013.01); *F16H 57/021* (2013.01); *H02K 15/14* (2013.01); *H02K 15/16* (2013.01); *F16H 2057/0056* (2013.01); *F16H 2057/0062* (2013.01); *F16H 2057/0225* (2013.01)

(58) Field of Classification Search
CPC ....... H02K 15/028; H02K 15/14; H02K 15/16
See application file for complete search history.

(56) References Cited

U.S. PATENT DOCUMENTS 8,076,892 B2 * 12/2011 Oguri ................ H02K 15/16
318/539
8,387,235 B2 * 3/2013 Pervaiz .............. H02K 15/0006
29/762

(Continued)

FOREIGN PATENT DOCUMENTS

CN    2378875 Y  * 12/1998
CN  204559335 U  *  8/2015
(Continued)

*Primary Examiner* — Peter Dungba Vo
*Assistant Examiner* — Jose K Abraham
(74) *Attorney, Agent, or Firm* — Osha Bergman Watanabe & Burton LLP

(57) ABSTRACT

The present invention provides a method for manufacturing a variable speed accelerator including: a preparation step of preparing a variable speed electric motor 71 including a variable speed rotor 72 in which a shaft insertion hole 74 extending in a horizontal direction is formed, a first variable speed rotor bearing 85*i* and a second variable speed rotor bearing 85*o* that rotatably support the variable speed rotor 72 by aligning an axial direction of the variable speed rotor 72 in the horizontal direction, and a variable speed stator 86 that surrounds the variable speed rotor 72 from an outer circumferential side; and a shaft insertion step of inserting a constant speed shaft 77 into the shaft insertion hole 74 of the variable speed rotor 72 in the horizontal direction so as to penetrate the variable speed rotor 72 after the preparation step.

7 Claims, 11 Drawing Sheets

(51) Int. Cl.
*H02K 15/16* (2006.01)
*F16H 57/021* (2012.01)
*F16H 1/28* (2006.01)
F16H 57/022 (2012.01)
F16H 57/00 (2012.01)

(56) References Cited

U.S. PATENT DOCUMENTS

| | | | |
|---|---|---|---|
| 10,177,692 B2 * | 1/2019 | Kobayashi | H02P 6/10 |
| 10,454,394 B2 * | 10/2019 | Okamoto | H02K 7/116 |
| 2005/0113201 A1 | 5/2005 | Kimura et al. | |
| 2005/0275298 A1 * | 12/2005 | Iversen | H02K 5/1672 |
| | | | 310/90 |
| 2016/0003263 A1 * | 1/2016 | Yoshida | F04D 17/10 |
| | | | 29/888.024 |
| 2017/0085159 A1 * | 3/2017 | Sauer | H02K 15/16 |
| 2017/0141706 A1 * | 5/2017 | Kobayashi | H02K 7/003 |
| 2017/0170755 A1 * | 6/2017 | Okamoto | H02P 5/46 |
| 2019/0107189 A1 | 4/2019 | Kobayashi et al. | |

FOREIGN PATENT DOCUMENTS

| | | | |
|---|---|---|---|
| CN | 204721173 U | * | 10/2015 |
| CN | 204721173 U | | 10/2015 |
| CN | 208078841 U | * | 11/2018 |
| JP | 4472350 B2 | | 6/2010 |
| JP | 2014-007933 A | | 1/2014 |
| WO | 2018/016019 A1 | | 1/2018 |

* cited by examiner

METHOD FOR MANUFACTURING VARIABLE SPEED ACCELERATOR AND METHOD FOR CONNECTING SHAFT JIG

BACKGROUND OF THE INVENTION

Field of the Invention

The present invention relates to a method for manufacturing a variable speed accelerator and a shaft jig.

Priority is claimed on Japanese Patent Application No. 2018-220623, filed on Nov. 26, 2018, the content of which is incorporated herein by reference.

Description of Related Art

As a variable speed accelerator for driving a rotary machine, such as a compressor, there is an accelerator including an electric device having a constant speed electric motor and a variable speed electric motor, and a planetary gear transmission device. The constant speed electric motor rotates a constant speed shaft to generate a rotational driving force. The constant speed shaft rotates a constant speed input shaft of the planetary gear transmission device. The variable speed electric motor rotates a variable speed rotor. The variable speed rotor rotates a variable speed input shaft of the planetary gear transmission device. The planetary gear transmission device shifts and transmits the rotational driving force transmitted to the constant speed input shaft and the variable speed input shaft to the rotary machine. Among such variable speed accelerators, there is an accelerator having a structure provided with a hollow portion that extends in a center axis direction such that the constant speed shaft is inserted thereinto, in the variable speed rotor.

For example, Japanese Patent Application No. 4472350 discloses a configuration including a hollow rotor (rotating shaft) provided on a carrier that rotatably supports a plurality of gears, and a shaft (transmission driving shaft) inserted through the hollow rotor, in a planetary gear device.

SUMMARY OF THE INVENTION

In the configuration disclosed in Japanese Patent Application No. 4472350, it is necessary to perform alignment adjustment of the rotor and the shaft inserted through the hollow portion of the rotor respectively with predetermined accuracy. As a structure for this purpose, for example, a structure in which the rotor already accommodated in a casing is taken out once and the shaft is incorporated later into the rotor, or is incorporated into the casing later in a state where the shaft is inserted into the rotor in advance, can be considered. In such a structure, after the alignment adjustment of the shaft is performed, the alignment adjustment of the rotor and the shaft must be performed at the same timing. Therefore, it takes time and labor to assemble the rotor and the shaft, and the manufacturing efficiency deteriorates.

The invention provides a method for manufacturing a variable speed accelerator that makes efficient manufacturing possible, and a shaft jig.

According to a first aspect of the invention, there is provided a method for manufacturing a variable speed accelerator including: a preparation step of preparing a variable speed motor including a variable speed rotor in which a hollow portion extending in a horizontal direction is formed, a variable speed bearing that rotatably supports the variable speed rotor by aligning an axial direction of the variable speed rotor in the horizontal direction, and a variable speed stator that surrounds the variable speed rotor from an outer circumferential side with respect to the variable speed rotor; and a shaft insertion step of inserting a constant speed shaft into the hollow portion of the variable speed rotor in the horizontal direction so as to penetrate the variable speed rotor, after the preparation step.

With such a configuration, the constant speed shaft is inserted from the horizontal direction into the hollow portion of the variable speed rotor prepared in advance so as to extend in the horizontal direction. Accordingly, the constant speed shaft can be assembled without making a rotor into a divided structure. Therefore, it is not necessary to perform large-scaled alignment adjustment after the constant speed shaft is inserted.

In the method for manufacturing a variable speed accelerator according to a second aspect of the invention, a jig connection step of connecting a shaft jig to a first end of the constant speed shaft in a center axis direction, the jig connection step being performed before the shaft insertion step; and a shaft lifting step of lifting only the shaft jig to which the constant speed shaft is connected such that the constant speed shaft and the shaft jig are in a horizontal state, may further be provided, and in the shaft insertion step, the constant speed shaft may be inserted into the hollow portion of the variable speed rotor by moving the shaft jig in the axial direction of the variable speed rotor.

With such a configuration, by lifting only the shaft jig to which a first end of the constant speed shaft is connected, the constant speed shaft can be easily lifted in a horizontal state and moved in the horizontal direction regardless of the shape of the constant speed shaft. Accordingly, the constant speed shaft can be easily inserted in the horizontal direction into a shaft insertion hole of the variable speed rotor.

In the method for manufacturing a variable speed accelerator according to a third aspect of the invention, the shaft jig used in the shaft insertion step may include a fixed portion fixed to a first end of the constant speed shaft, a hanging portion extending from the fixed portion in a direction intersecting the center axis direction, a support portion extending in the center axis direction of the constant speed shaft from a position spaced apart from the fixed portion in the hanging portion, and a pair of suspension portions provided on the support portion so as to sandwich a location of a center of gravity of the shaft jig, which is fixed the constant speed shaft, in the center axis direction in the center axis direction in a state where the constant speed shaft is fixed to the fixed portion, and, in the shaft lifting step, the shaft jig may be lifted by holding only the suspension portion.

With such a configuration, in a state where the first end of the constant speed shaft is fixed to the fixed portion, the center of gravity at which the constant speed shaft and the shaft jig are aligned is positioned in an intermediate portion of the pair of suspension portions. Such a shaft jig can easily hold the constant speed shaft and the shaft jig while maintaining the constant speed shaft and the shaft jig in a horizontal state by lifting only the pair of suspension portions.

In the method for manufacturing a variable speed accelerator according to a fourth aspect of the invention, a jig removal step of removing the shaft jig from the constant speed shaft after the constant speed shaft is inserted into the hollow portion to a position where a second end of the constant speed shaft is exposed from the hollow portion, the jig removal step being performed after the shaft insertion step, may further be provided.

With such a configuration, after the second end of the constant speed shaft inserted into the hollow portion of the variable speed rotor is exposed from the hollow portion, the shaft jig is removed. Therefore, both ends of the constant speed shaft become in a state where nothing is attached thereto in a state of being visible from the outside. Accordingly, a jig or the like for supporting the constant speed shaft can be easily attached.

In the method for manufacturing a variable speed accelerator according to a fifth aspect of the invention, in the shaft insertion step, a counterweight may be detachably attached to the shaft jig on a side opposite to a side on which the constant speed shaft is fixed.

With such a configuration, in the fixed portion, the constant speed shaft is fixed to one side in the center axis direction of a constant speed shaft 77 and the counterweight is detachably fixed to the other side. Accordingly, by attaching the counterweight having different weights to the fixed portion in accordance with the weight of the constant speed shaft, the shaft jig can be prevented from tilting even when the weight of the constant speed shaft changes. In other words, it is easy to hold the constant speed shaft while maintaining the horizontal state regardless of the weight. Therefore, it is possible to easily insert the constant speed shaft into the hollow portion of the variable speed rotor while maintaining the state where the constant speed shaft fixed to the shaft jig is horizontally suspended by a lifting machine.

In the method for manufacturing a variable speed accelerator according to a sixth aspect of the invention, an alignment adjustment step of performing alignment adjustment of the constant speed shaft, the alignment adjustment step being performed after the shaft insertion step, may further be provided.

With such a configuration, the constant speed shaft can be installed in the hollow portion of the variable speed rotor prepared in advance such that the hollow portion extends in the horizontal direction, with higher accuracy.

In the method for manufacturing a variable speed accelerator according to a seventh aspect of the invention, in the alignment adjustment step, an extension shaft extending in a center axis direction of the constant speed shaft may be attached to an end portion of the constant speed shaft, and a position of the extension shaft may be measured.

With such a configuration, even in a case where a protrusion amount from the variable speed motor in the end portion of the constant speed shaft is small, by providing the extension shaft, alignment adjustment of the constant speed shaft can be easily performed.

According to an eighth aspect of the invention, there is provided a shaft jig including: a fixed portion fixed to a first end of a shaft extending in a center axis direction; a hanging portion extending from the fixed portion in a direction intersecting the center axis direction; a support portion extending in the center axis direction from a position spaced apart from the fixed portion in the hanging portion; and a pair of suspension portions provided on the support portion so as to sandwich a location of a center of gravity of the shaft jig, which is fixed the constant speed shaft, in the center axis direction in the center axis direction in a state where the shaft is fixed to the fixed portion.

According to the invention, it is possible to insert the constant speed shaft into the hollow portion of the variable speed rotor of which the alignment is adjusted without breaking the alignment of the variable speed rotor.

DETAILED DESCRIPTION OF THE INVENTION

Hereinafter, an embodiment for carrying out a method for manufacturing a variable speed accelerator and a shaft jig according to the invention will be described with reference to the attached drawings. However, the invention is not limited only to the embodiment.

Figure 1:
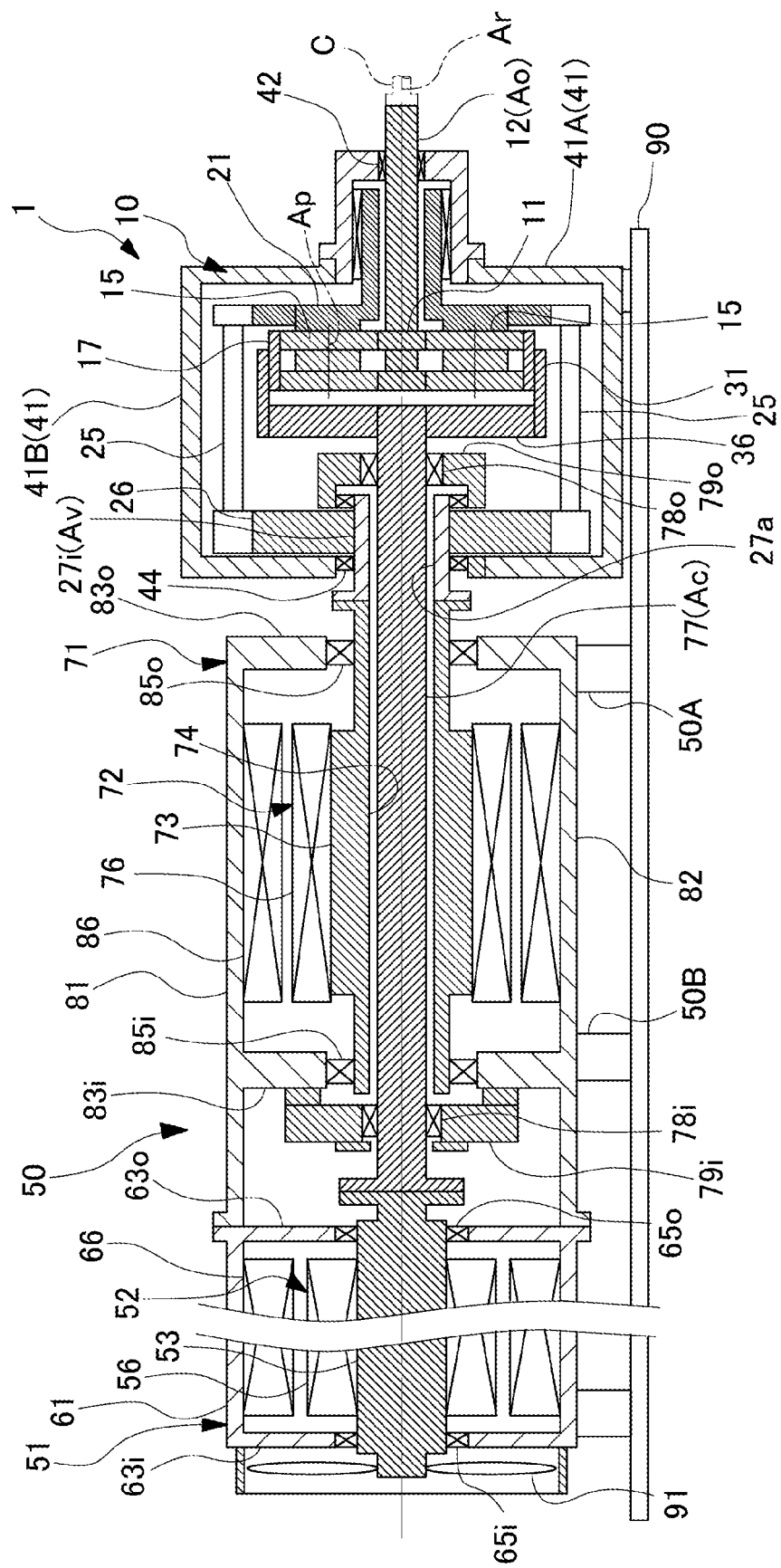
FIG. 1 is a sectional view showing the overall configuration of a variable speed accelerator according to an embodiment of the invention.

As shown in FIG. 1, a variable speed accelerator 1 according to the embodiment includes an electric device 50 that generates a rotational driving force, and a transmission device 10 that shifts the rotational driving force generated by the electric device 50 and transmits the shifted rotational driving force to a driving target. The variable speed accelerator 1 can be employed to, for example, a fluid mechanical system, such as a compressor system. The driving target of the variable speed accelerator 1 of the embodiment is a compressor C.

The transmission device 10 is a planetary gear transmission device. The electric device 50 includes a constant speed electric motor 51 having a constant speed rotor 52 which rotates at a constant speed, and a variable speed electric motor (variable speed motor) 71 having a variable speed rotor 72 which rotates at any rotational speed. The constant speed rotor 52 and the variable speed rotor 72 are connected to the transmission device 10, respectively.

The electric device 50 and the transmission device 10 are supported by a base plate 90. Accordingly, it is possible to reliably fix the electric device 50 and the transmission device 10 which are heavy objects.

Hereinafter, a direction in which an axis Ar extends is an axial direction, one side in the axial direction is an output side, and a side opposite to the output side is an input side. In addition, a radial direction around the axis Ar is simply referred to as a radial direction. In the variable speed accelerator 1 of the embodiment, the electric device 50 is disposed on the input side in the axial direction, and the transmission device 10 is disposed on the output side of the electric device 50. The compressor C is disposed on the output side of the variable speed accelerator 1.

The transmission device 10 includes a sun gear 11, a sun gear shaft 12, a plurality of planetary gears 15, an internal gear (gear) 17, a planetary gear carrier 21, an internal gear carrier (gear carrier) 31, and a transmission casing 41.

The sun gear 11 rotates around the axis Ar that extends in a horizontal direction. The sun gear shaft 12 is fixed to the sun gear 11. The sun gear shaft 12 is supported by a sun gear bearing 42 disposed on the output side of the sun gear 11 so as to be rotatable around the axis Ar. The sun gear bearing 42 is attached to the transmission casing 41. For example, a rotor of the compressor C that serves as a driving target is connected to the output side end portion of the sun gear shaft 12.

A plurality of planetary gears 15 are provided in a circumferential direction around the axis Ar on the outer side in the radial direction of the sun gear 11. Each planetary gear 15 meshes with the sun gear 11, revolves around the axis Ar and rotates around a center line Ap thereof.

The planetary gear carrier 21 supports the plurality of planetary gears 15 so as to be capable of revolving around the axis Ar and rotating around the center line Ap of the planetary gear 15 thereof.

A plurality of teeth of the internal gear 17 are arranged in an annular shape around the axis Ar and mesh with the plurality of planetary gears 15.

The transmission device 10 further includes an input side planetary gear carrier shaft 27i connected to the variable speed rotor 72 of the variable speed electric motor 71, and a transmission shaft 25 which transmits the rotation of the input side planetary gear carrier shaft 27i to the planetary gear carrier 21.

The input side planetary gear carrier shaft 27i forms a cylindrical shape around the axis Ar. In other words, the input side planetary gear carrier shaft 27i is formed with a through hole (hollow portion) 27a penetrating the inside in the axial direction. The input side planetary gear carrier shaft 27i is disposed on the input side of the transmission device 10, and is supported by a second planetary gear carrier bearing 44 so as to be rotatable around the axis Ar. The second planetary gear carrier bearing 44 is attached to the transmission casing 41. The constant speed shaft (gear carrier shaft) 77 for driving the internal gear carrier 31 of the transmission device 10 is inserted into the through hole 27a on an inner circumferential side of the input side planetary gear carrier shaft 27i.

A variable speed input gear 26 is provided on the outer circumferential side of the input side planetary gear carrier shaft 27i. The variable speed input gear 26 rotates integrally with the input side planetary gear carrier shaft 27i.

The transmission shaft 25 is supported so as to be rotatable. The transmission shaft 25 is attached to the transmission casing 41 via a bearing (not shown). One end of the transmission shaft 25 meshes with a gear formed at the outer circumference of the variable speed input gear 26. The second end of the transmission shaft 25 meshes with a gear formed at the outer circumference of the planetary gear carrier 21. Accordingly, the rotation of the input side planetary gear carrier shaft 27i is transmitted as rotation in a direction opposite to the planetary gear carrier 21 via the transmission shaft 25.

The internal gear carrier 31 supports the internal gear 17 to be rotatable around the axis Ar. The internal gear carrier 31 has a cylindrical shape around the axis Ar, and the internal gear 17 is fixed to the inner circumferential side.

A planetary input gear 36 is provided on the inner circumferential side of the input side end of the internal gear carrier 31. The planetary input gear 36 is fixed to an output side end of the constant speed shaft (shaft) 77 which will be described later.

The transmission casing 41 has a structure vertically divided into two and includes a lower casing 41A and an upper casing 41B. The lower casing 41A is supported on the base plate 90. The upper casing 41B is provided so as to cover the sun gear 11, the sun gear shaft 12, the plurality of planetary gears 15, the internal gear 17, the planetary gear carrier 21, and the internal gear carrier 31.

The constant speed electric motor 51 is driven to rotate the constant speed shaft 77. The variable speed electric motor 71 is driven to rotate the input side planetary gear carrier shaft 27i of the transmission device 10.

In the embodiment, the constant speed electric motor 51 is, for example, a four-pole three-phase induction electric motor. In addition, the variable speed electric motor 71 is an eight-pole three-phase induction electric motor having more poles than the constant speed electric motor 51. In addition, the specifications of the constant speed electric motor 51 and the variable speed electric motor 71 are not limited thereto, and the specifications can be appropriately changed.

The constant speed electric motor 51 includes the constant speed rotor 52, a constant speed stator 66, and a constant speed electric motor casing 61.

The constant speed rotor 52 includes a constant speed rotor shaft 53 which forms a columnar shape around the axis Ar, and a conductor 56 which is fixed to the outer circumference of the constant speed rotor shaft 53.

The constant speed stator 66 is disposed on the radially outside of the conductor 56 of the constant speed rotor 52. The constant speed stator 66 is formed of a plurality of coils.

The constant speed electric motor casing 61 has a cylindrical shape around the axis Ar, and the constant speed stator 66 is fixed on the inner circumferential side. Both ends of the constant speed electric motor casing 61 in the axial direction are blocked by an input side lid 63i and an output side lid 63o. Constant speed rotor bearings 65i and 65o which support the constant speed rotor shaft 53 to be rotatable around the axis Ar, are attached to each of the input side lid 63i and the output side lid 63o.

The input side end of the constant speed rotor shaft 53 protrudes to the input side from the input side lid 63i of the constant speed electric motor casing 61. A cooling fan 91 for cooling the constant speed electric motor 51 is fixed to the input side end of the constant speed rotor shaft 53. The output side end of the constant speed rotor shaft 53 is connected to the constant speed shaft 77. In other words, in the constant speed electric motor 51, the constant speed shaft 77 is rotated by rotating the constant speed rotor shaft 53.

The variable speed electric motor 71 includes a variable speed rotor 72, a variable speed stator 86, and a variable speed electric motor casing 81.

The variable speed rotor 72 includes a variable speed rotor shaft 73 and a conductor 76 which is fixed to the outer circumference of the variable speed rotor shaft 73. The variable speed rotor shaft 73 has a cylindrical shape around the axis Ar and has a shaft insertion hole (hollow portion) 74 which penetrates in the axial direction. The output side end of the variable speed rotor 72 is connected to the input side planetary gear carrier shaft 27i which is a variable speed input shaft Av.

The variable speed stator 86 is disposed on the radially outside of the conductor 76 of the variable speed rotor 72. The variable speed stator 86 is formed of a plurality of coils.

The variable speed electric motor casing 81 has a variable speed casing main body 82, an output side partition wall 83o, and an input side partition wall 83i.

The variable speed casing main body 82 has a cylindrical shape around the axis Ar, and the variable speed stator 86 is fixed to the inner circumferential side. The output side partition wall 83o blocks the output side end of the cylindrical variable speed casing main body 82. The input side partition wall 83i is disposed further on the input side than the variable speed stator 86 and blocks the inner circumferential side of the cylindrical variable speed casing main body 82. A first variable speed rotor bearing (variable speed bearing) 85i and a second variable speed rotor bearing (variable speed bearing) 85o are attached to each of the input side partition wall 83i and the output side partition wall 83o. The first variable speed rotor bearing 85i and the second variable speed rotor bearing 85o support the variable speed rotor shaft 73 so as to be rotatable around the axis Ar.

The constant speed shaft 77 is inserted through the shaft insertion hole 74 of the variable speed rotor shaft 73 and the through hole 27a of the input side planetary gear carrier shaft 27i. Both end portions of the constant speed shaft 77 are supported by a first bearing 78i and a second bearing 78o so as to be rotatable around the axis Ar. The first bearing 78i is attached to a first bearing bracket 79i provided on the input side partition wall 83i. The second bearing 78o is attached to a second bearing bracket 79o provided on the lower casing 41A of the transmission casing 41. Each of the first bearing 78i and the second bearing 78o has a structure vertically divided into two.

The input side end of the constant speed shaft 77 protrudes from the first bearing 78i to the input side and is connected to the constant speed rotor shaft 53. The output side end of the constant speed shaft 77 protrudes from the second bearing 78o to the output side and is connected to the planetary input gear 36.

In such a variable speed accelerator 1, the constant speed shaft 77 is a constant speed input shaft Ac that rotates at a constant speed by the driving force of the constant speed electric motor 51. The input side planetary gear carrier shaft 27i is the variable speed input shaft Av which rotates at any rotational speed by the driving force of the variable speed electric motor 71. In the variable speed accelerator 1, by changing the rotational speed of the variable speed electric motor 71, it is possible to change the rotational speed of the sun gear shaft 12 which is an output axis Ao of the transmission device 10 connected to a driving target.

In the variable speed accelerator 1 of the embodiment, the constant speed rotor 52, the constant speed shaft 77, the variable speed rotor 72, the input side planetary gear carrier shaft 27i, and the sun gear shaft 12 are disposed on the same axis Ar.

Figure 2:
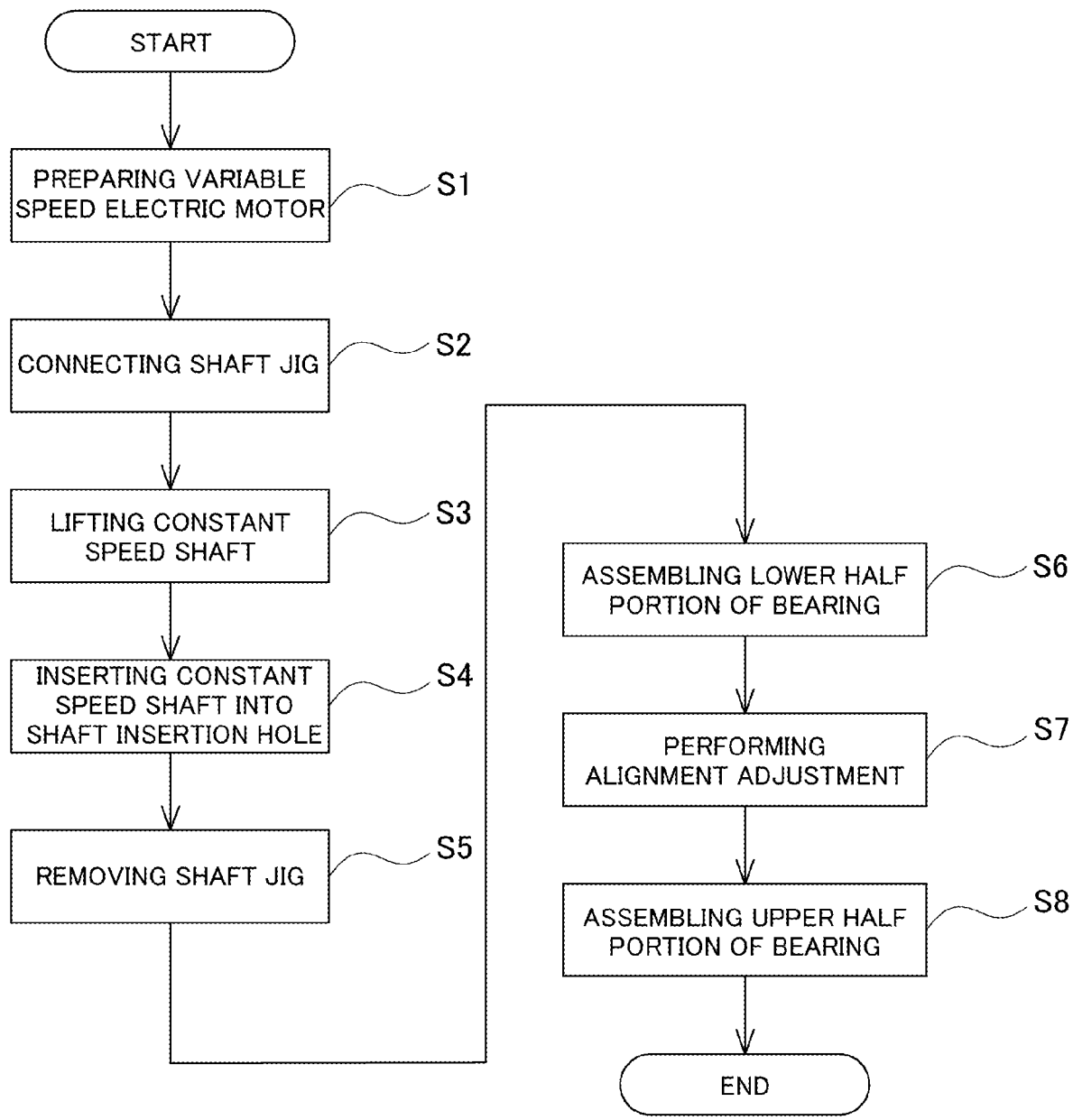
FIG. 2 is a flowchart showing a flow of a method for manufacturing a variable speed accelerator.

Next, a method for manufacturing the variable speed accelerator 1 will be described. As shown in FIG. 2, the method for manufacturing the variable speed accelerator 1 includes a preparation step S1, a jig connection step S2, a shaft lifting step S3, a shaft insertion step S4, a jig removal step S5, a bearing lower half portion assembly step S6, an alignment adjustment step S7, and a bearing upper half portion assembly step S8.

Figure 3:
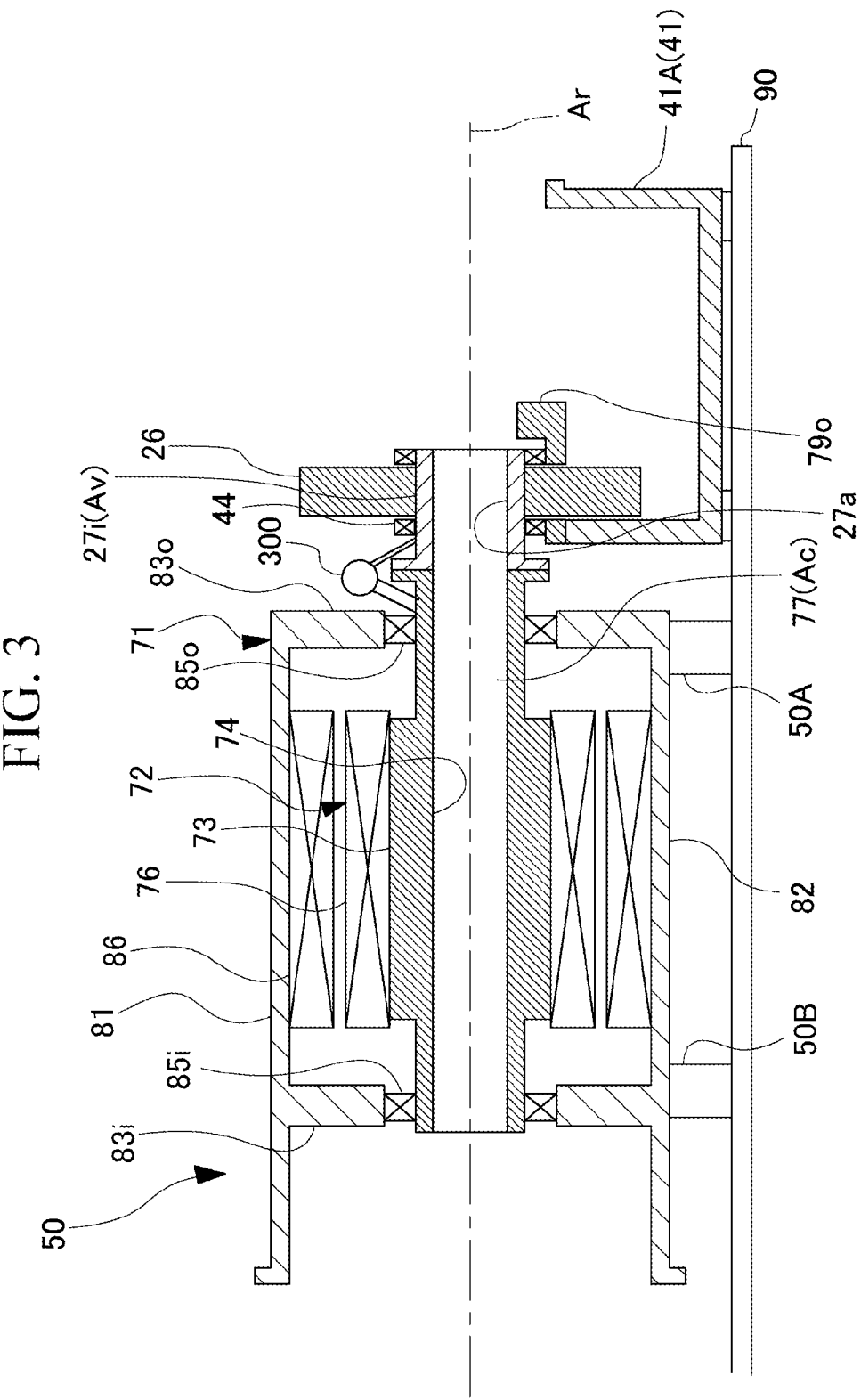
FIG. 3 is a sectional view showing a variable speed electric motor prepared in a preparation step in the method for manufacturing a variable speed accelerator.

As shown in FIG. 3, in the preparation step S1, the variable speed electric motor 71 is prepared. In the preparation step S1, the variable speed electric motor 71 including the variable speed rotor 72 is installed. For this purpose, first, the lower casing 41A of the transmission casing 41 that configures the transmission device 10 is installed on the base plate 90. In addition, the variable speed electric motor 71 is temporarily placed on the base plate 90. In the variable speed electric motor 71, the variable speed stator 86 and the variable speed rotor 72 are incorporated in advance inside the variable speed electric motor casing 81 in a state where alignment adjustment is performed. When the variable speed electric motor 71 is temporarily placed on the base plate 90, the heights of the first electric device support portion 50A and the second electric device support portion 50B are adjusted such that the center axis of the variable speed rotor 72 is horizontal. Accordingly, the axial direction in the variable speed electric motor 71 is aligned with the horizontal direction. Furthermore, the lower casing 41A and the variable speed electric motor casing 81 are disposed so as to be aligned such that the interval in the axial direction is a predetermined dimension. As a result, the shaft insertion hole 74 and the through hole 27a are in a state of extending in the horizontal direction in a connected state.

After the alignment, the second bearing bracket 79o is attached onto the lower casing 41A of the transmission casing 41. Subsequently, the input side planetary gear carrier shaft 27i is incorporated on the second bearing bracket 79o. Next, the alignment adjustment of the output side end of the variable speed rotor shaft 73 is performed with the input side planetary gear carrier shaft 27i as a reference. For this purpose, a positional deviation amount in the vertical direction between the input side planetary gear carrier shaft 27i and the variable speed rotor shaft 73 of the variable speed rotor 72 is measured by a measuring instrument, such as the dial gauge 300. Based on the measurement result, the height of the variable speed casing main body 82 is adjusted such that the positional deviation amount in the vertical direction between the input side planetary gear carrier shaft 27i and the variable speed rotor shaft 73 is within a predetermined allowable range. The adjustment of the height of the variable speed casing main body 82 is performed, for example, as a shim (not shown) is inserted between the first electric device support portion 50A and the second electric device support portion 50B provided on the lower side of the variable speed casing main body 82 and the base plate 90.

Figure 4:
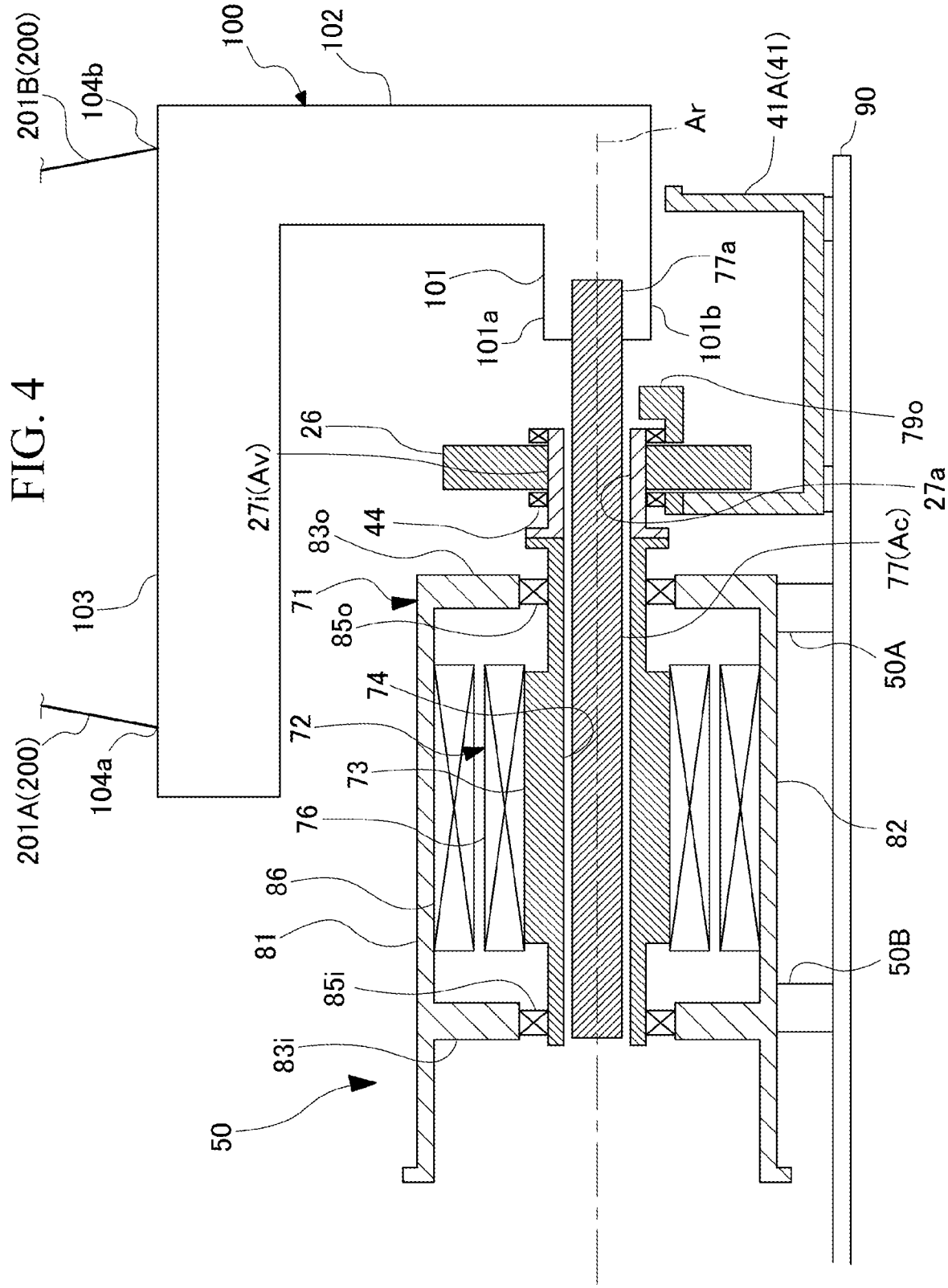
FIG. 4 is a sectional view showing a shaft insertion step in the method for manufacturing a variable speed accelerator.
Figure 5:
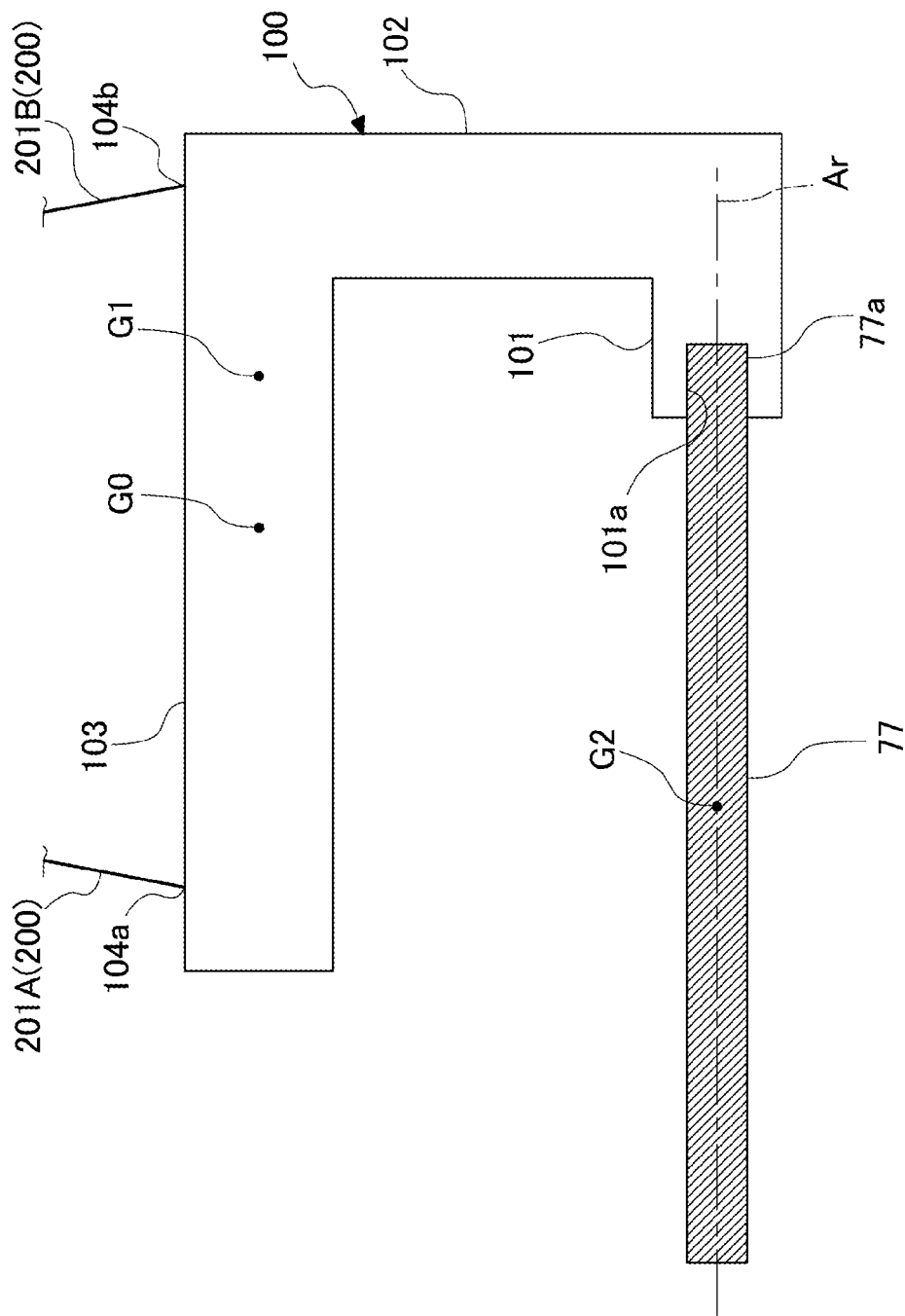
FIG. 5 is a view showing a constant speed shaft to which a shaft jig used in the shaft insertion step is attached.

The jig connection step S2 is performed after the preparation step S1. In the jig connection step S2, a shaft jig 100 is connected to a first end 77a of the constant speed shaft 77 in the center axis direction. As shown in FIGS. 4 and 5, the shaft jig 100 includes a fixed portion 101, a hanging portion 102, a support portion 103, a first suspension portion (suspension portion) 104a, and a second suspension portion (suspension portion) 104b.

The fixed portion 101 extends in the horizontal direction so as to be parallel to the constant speed shaft 77. The fixed portion 101 is detachably connected to a first end 77a of the constant speed shaft 77 by a bolt or the like. For example, the fixed portion 101 is formed with a fixing hole 101a into which the first end 77a of the constant speed shaft 77 can be inserted. In a state where the first end 77a of the constant speed shaft 77 is inserted into the fixing hole 101a, by bolting from the outside of the fixed portion 101, the fixed portion 101 is connected to the output side end of the constant speed shaft 77.

The hanging portion 102 extends upward with respect to the fixed portion 101, that is, in a direction orthogonal to a direction in which the fixed portion 101 extends. Therefore, the hanging portion 102 extends in a direction intersecting the center axis direction of the constant speed shaft 77 in a state where the shaft jig 100 is attached to the constant speed shaft 77. In the embodiment, the hanging portion 102 extends from the end portion on the output side of the fixed portion 101 upward in a perpendicular direction.

The support portion 103 extends from the upper end of the hanging portion 102 in parallel with the center axis direction of the constant speed shaft 77. In other words, the support portion 103 extends from a position spaced apart from the fixed portion 101 in the hanging portion 102. The support portion 103 extends from the upper end of the hanging portion 102 toward the same side (left side in FIGS. 4 and 5) as the side on which the constant speed shaft 77 is attached to the fixed portion 101, in parallel with the fixed portion 101. In other words, the support portion 103 extends in a center axis direction of the constant speed shaft 77 in a state where the shaft jig 100 is attached to the constant speed shaft 77. Accordingly, the support portion 103 is positioned above the constant speed shaft 77 with first end 77a fixed to the fixed portion 101.

Further, the hanging portion 102 is formed with a length that the support portion 103 is disposed above the variable speed electric motor casing 81 of the variable speed electric motor 71 in a state where the height of the constant speed shaft 77 connected to the fixed portion 101 is aligned with the axis Ar of the variable speed rotor 72.

Here, in a state where the constant speed shaft 77 is fixed to the fixed portion 101, the center of gravity of a system combining the constant speed shaft 77 and the shaft jig 100 in the center axis direction of the constant speed shaft 77 is referred to as a center of gravity G0. In addition, the center of gravity of the shaft jig 100 alone is referred to as a center of gravity G1. The center of gravity of the constant speed shaft 77 alone is referred to as a center of gravity G2. As shown in FIG. 5, the center of gravity G0 is positioned between the center of gravity G1 and the center of gravity G2 in the center axis direction of the constant speed shaft 77.

The first suspension portion 104a and the second suspension portion 104b are provided on the support portion 103. The shaft jig 100 is lifted via the first suspension portion 104a and the second suspension portion 104b. The first suspension portion 104a and the second suspension portion 104b are provided on both sides of the center of gravity G0 in a state where the constant speed shaft 77 is fixed to the fixed portion 101. The first suspension portion 104a and the second suspension portion 104b are provided at equidistant positions across the center of gravity G0 in the center axis direction of the constant speed shaft 77.

In the shaft lifting step S3, the constant speed shaft 77 is lifted. Specifically, in the shaft lifting step S3, the shaft jig 100 to which the constant speed shaft 77 is connected is lifted by a lifting machine 200, such as an overhead crane. Accordingly, the constant speed shaft 77 is indirectly lifted through the shaft jig 100. At this time, the lower end of a first wire 201A is connected to the first suspension portion 104a, and the lower end of the second wire 201B is connected to the second suspension portion 104b, respectively. The upper ends of the first wire 201A and the second wire 201B are supported by the lifting machine 200, such as an overhead crane.

After the connection of the first wire 201A and the second wire 201B, the first wire 201A and the second wire 201B are pulled up by the lifting machine 200. The support portion 103 provided with the first suspension portion 104a and the second suspension portion 104b is lifted via the first wire 201A and the second wire 201B. As a result, the shaft jig 100 and the constant speed shaft 77 are lifted. Since the lifted shaft jig 100 and the constant speed shaft 77 have the first suspension portion 104a connected to the first wire 201A and the second suspension portion 104b connected to the second wire 201B on both sides of the center of gravity G0, a state where the center axis direction is aligned with the horizontal direction is maintained. In other words, in the shaft lifting step S3, only the first suspension portion 104a and the second suspension portion 104b of the shaft jig 100 are lifted such that the constant speed shaft 77 and the shaft jig 100 are in a horizontal state.

In the shaft insertion step S4, the constant speed shaft 77 is inserted into the shaft insertion hole 74. In the shaft insertion step S4 of the embodiment, the constant speed shaft 77 is inserted such that the variable speed rotor 72 is inserted from the horizontal direction into the shaft insertion hole 74 of the variable speed rotor 72 and the through hole 27a of the input side planetary gear carrier shaft 27i. For this purpose, the position of the center axis of the constant speed shaft 77 lifted by the lifting machine 200 is aligned with the axis Ar of the variable speed rotor 72. Subsequently, the shaft jig 100 is moved in the horizontal direction along the axis Ar of the variable speed rotor 72 by the lifting machine 200. As a result, as shown in FIG. 4, the constant speed shaft 77 connected to the fixed portion 101 is inserted in the order of the through hole 27a of the input side planetary gear carrier shaft 27i and the shaft insertion hole 74 of the variable speed rotor 72.

Figure 6:
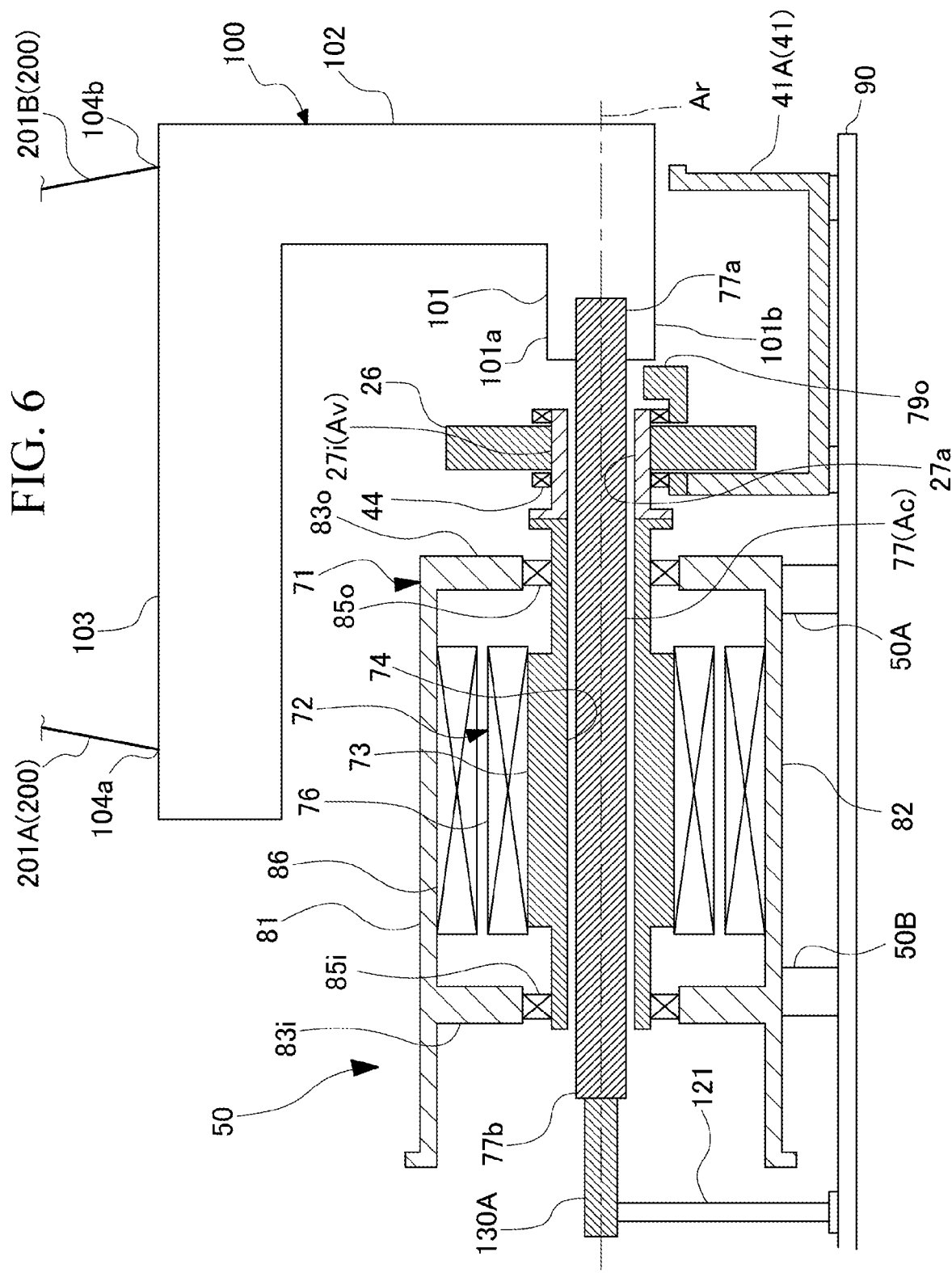
FIG. 6 is a sectional view showing a jig removal step in the method for manufacturing a variable speed accelerator.

As shown in FIG. 6, the constant speed shaft 77 is inserted into the shaft insertion hole 74 until the second end 77b of the constant speed shaft 77 is exposed (protrudes) from the shaft insertion hole 74 to the input side. Thereafter, the constant speed shaft 77 is inserted into the shaft insertion hole 74 of the variable speed rotor 72 to a specified position in the direction of the axis Ar. The specified position is a position of the constant speed shaft 77 with respect to the variable speed rotor 72 when the variable speed accelerator 1 is operated.

Thereafter, an input side extension jig (extension jig) 130A is attached to the second end 77b of the constant speed shaft 77. The input side extension jig 130A has a columnar shape and extends in the axial direction. As being attached to the constant speed shaft 77, the input side extension jig 130A in a state of extending straight from the second end 77b of the constant speed shaft 77 in the axial direction so as to extend the constant speed shaft 77. The input side extension jig 130A is detachably connected to the second end 77b of the constant speed shaft 77 by a bolt or the like. After being attached to the second end 77b of the constant speed shaft 77, the input side extension jig 130A is supported on the base plate 90 by a second support tool 121.

Figure 7:
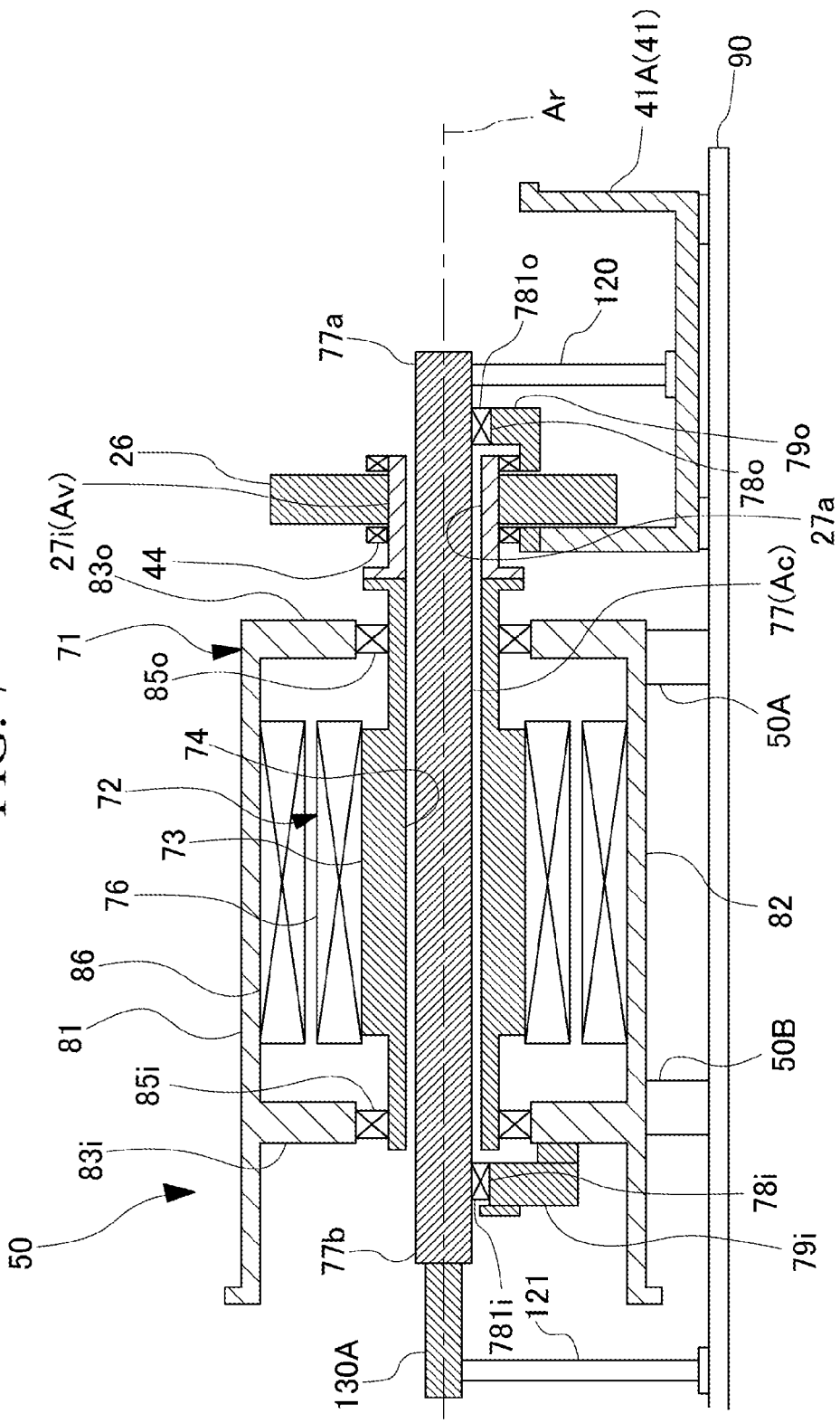
FIG. 7 is a view showing a situation in which a lower half portion of a bearing is incorporated in a state of being supported by a constant speed shaft jig in the method for manufacturing a variable speed accelerator.

Thereafter, in the jig removal step S5, the shaft jig 100 is removed from a first end 77a of the constant speed shaft 77. In this state, as shown in FIG. 7, the first end 77a of the constant speed shaft 77 is supported by the first support tool 120. Here, in the embodiment, the first support tool 120 is provided on the lower casing 41A of the transmission casing 41. Accordingly, the constant speed shaft 77 from which the shaft jig 100 is removed at the specified position is in a state of being supported only by the first support tool 120 and the second support tool 121. In this state, the constant speed shaft 77 is maintained in a horizontal state.

In addition, an output side extension jig (extension jig) may be attached to the first end 77a of the constant speed shaft 77 from which the shaft jig 100 is removed. The output side extension jig preferably has a columnar shape and extends in the axial direction, similar to the input side extension jig 130A. As being attached to the constant speed shaft 77, the output side extension jig extends to protrude from the first end 77a of the constant speed shaft 77 to the output side of the constant speed shaft 77 so as to extend the constant speed shaft 77. The output side extension jig is detachably connected to the first end 77a of the constant speed shaft 77 by a bolt or the like.

The bearing lower half portion assembly step S6 is performed after the jig removal step S5. In the bearing lower half portion assembly step S6, the lower half portion of the bearing is assembled. Specifically, in the bearing lower half portion assembly step S6, a first bearing lower half portion 781i of the first bearing 78i and a second bearing lower half portion 781o of the second bearing 78o which support the constant speed shaft 77 to be rotatable is incorporated under the constant speed shaft 77. The first bearing lower half portion 781i is provided on the first bearing bracket 79i after the first bearing bracket 79i is attached to the input side partition wall 83i. In addition, the second bearing lower half portion 781o is provided on the second bearing bracket 79o of the lower casing 41A. Accordingly, the constant speed shaft 77 is supported on the first bearing lower half portion 781i and the second bearing lower half portion 781o.

In this manner, in a state where the constant speed shaft 77 is supported by the first bearing lower half portion 781i and the second bearing lower half portion 781o, the input side extension jig 130A attached to the constant speed shaft 77 and the first support tool 120 and the second support tool 121 are removed from both ends of the constant speed shaft 77.

Figure 8:
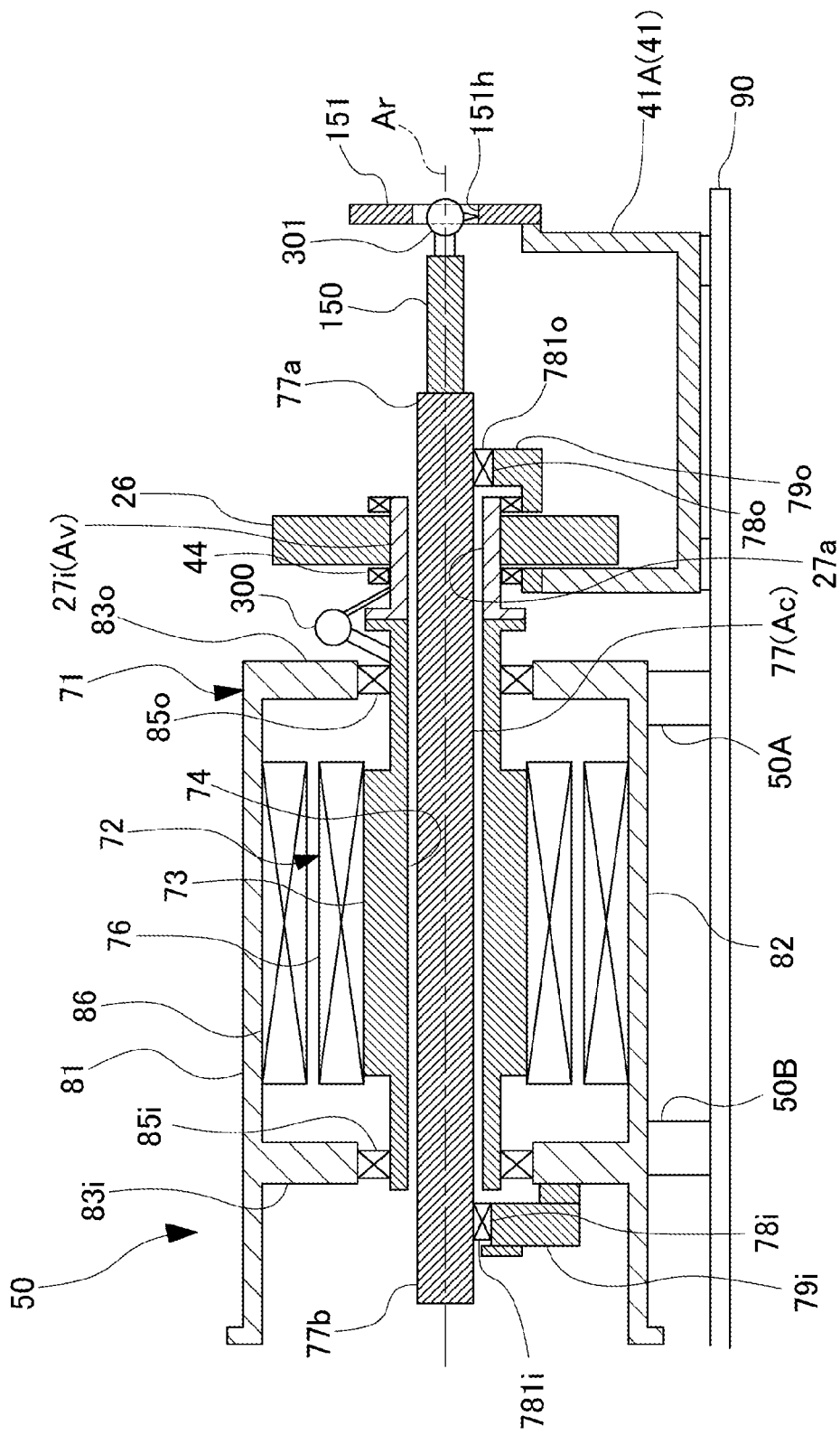
FIG. 8 is a sectional view showing an alignment adjustment step in the method for manufacturing a variable speed accelerator.

The alignment adjustment step S7 is performed after the bearing lower half portion assembly step S6. In the alignment adjustment step S7, the alignment adjustment of the constant speed shaft 77 is performed. As shown in FIG. 8, an alignment dummy shaft (extension shaft) 150 is attached to the first end 77a of the constant speed shaft 77. The alignment dummy shaft 150 has a columnar shape and extends in the axial direction. As being attached to the constant speed shaft 77, the alignment dummy shaft 150 extends from the first end 77a of the constant speed shaft 77 to the output side so as to extend the constant speed shaft 77. The alignment dummy shaft 150 is detachably attached to the first end 77a of the constant speed shaft 77 with a bolt or the like. The alignment dummy shaft 150 is attached such that the constant speed shaft 77 and the center axis are aligned with each other.

In addition, an alignment jig 151 is attached onto the lower casing 41A of the transmission casing 41. The alignment jig 151 has a ring shape, and a circular hole 151h is formed in the center portion. The alignment jig 151 is fixed to the lower casing 41A such that the hole 151h is at a position where the alignment dummy shaft 150 can be inserted.

In the alignment adjustment step S7, the measuring instrument, such as a dial gauge 301, is attached to a tip end of the alignment dummy shaft 150 by aligning the position with a center axis position of the alignment dummy shaft 150.

Thereafter, the dial gauge 301 measures the radial (vertical) interval between the center axis position of the alignment dummy shaft 150 and the inner circumferential surface of the hole 151h of the alignment jig 151. Based on the measurement result, the position of the variable speed casing main body 82 is finely adjusted such that the radial interval between the center axis position of the alignment dummy shaft 150 and the inner circumferential surface of the hole 151h of the alignment jig 151 is within a predetermined allowable range. Here, the allowable range is the position of the constant speed shaft 77 with respect to the transmission device 10 when the variable speed accelerator 1 is operated. The adjustment of the position of the variable speed casing main body 82 is performed by inserting a shim between the second electric device support portion 50B provided on the input end side of the variable speed casing main body 82 and the variable speed casing main body 82.

Further, when the height of the second electric device support portion 50B on the input end side is adjusted by inserting the shim, there is a case where the positional deviation amount in the radial direction between the input side planetary gear carrier shaft 27i and the variable speed rotor shaft 73 of the variable speed rotor 72 increases. Here, the positional deviation amount in the radial direction between the input side planetary gear carrier shaft 27i and the variable speed rotor shaft 73 of the variable speed rotor 72 is measured by a measuring instrument, such as the dial gauge 300. Based on the measurement result, the height of the variable speed casing main body 82 is adjusted such that the positional deviation amount in the radial direction (vertical direction) between the input side planetary gear carrier shaft 27i and the variable speed rotor shaft 73 of the variable speed rotor 72 is within a predetermined allowable range. The adjustment of the height of the variable speed casing main body 82 is performed by inserting the shim between the first electric device support portion 50A provided on the output end side of the variable speed casing main body 82 and the variable speed casing main body 82.

Furthermore, when necessary, measurement and adjustment of the interval in the radial direction between the center axis position of the alignment dummy shaft 150 and the inner circumferential surface of the hole 151h of the alignment jig 151, and measurement and adjustment of the positional deviation amount in the radial direction between the input side planetary gear carrier shaft 27i and the variable speed rotor shaft 73 of the variable speed rotor 72 are repeated a plurality of times until the interval and the positional deviation amount are within the allowable range.

Accordingly, the positions of the input side planetary gear carrier shaft 27i of the transmission device 10, the variable speed rotor 72 of the variable speed electric motor 71, and the constant speed shaft 77 are adjusted such that the respective center axes are aligned with each other.

In addition, in the alignment adjustment step S7, the method for performing the alignment adjustment of the constant speed shaft 77, the position for measuring the position of the constant speed shaft 77 for the alignment adjustment, the measuring instrument used for the measurement, and the like, can be appropriately changed in addition to the description above.

Figure 9:
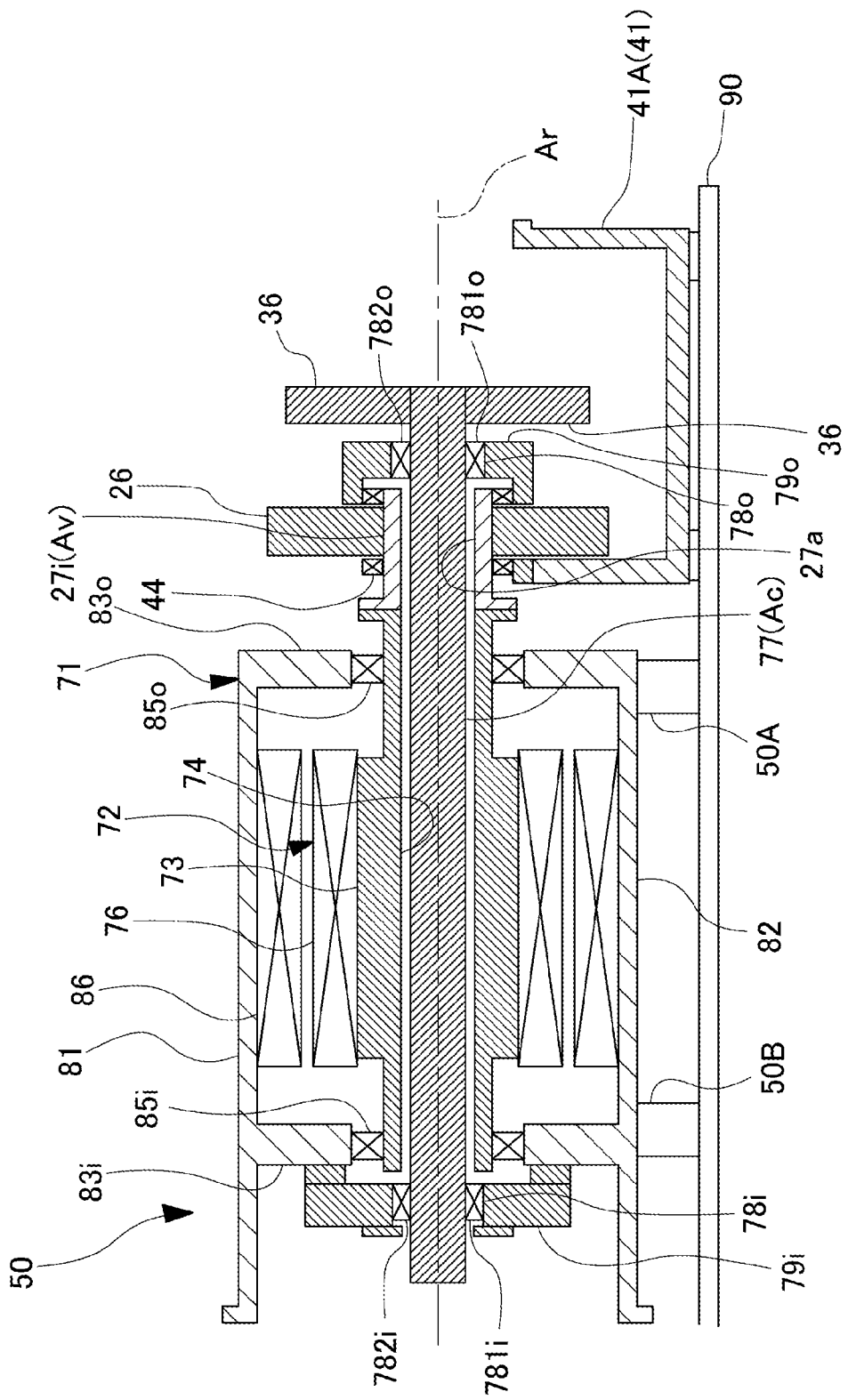
FIG. 9 is a sectional view showing a state where a first bearing upper half portion and a second bearing upper half portion of the bearing are incorporated in the method for manufacturing a variable speed accelerator.

In the bearing upper half portion assembly step S8, the upper half portion of the bearing is assembled. Specifically, in the bearing upper half portion assembly step S8, as shown in FIG. 9, a first bearing upper half portion 782i of the first bearing 78i and a second bearing upper half portion 782o of the second bearing 78o are respectively incorporated on the first bearing lower half portion 781i and the second bearing lower half portion 781o. Thereafter, the alignment dummy shaft 150 and the alignment jig 151 are removed. Accordingly, the constant speed shaft 77 inserted through the shaft insertion hole 74 of the variable speed rotor 72 can be attached to the transmission device 10 and the variable speed electric motor 71 to be rotatable around the axis Ar in a state of being aligned with the axis Ar.

Figure 10:
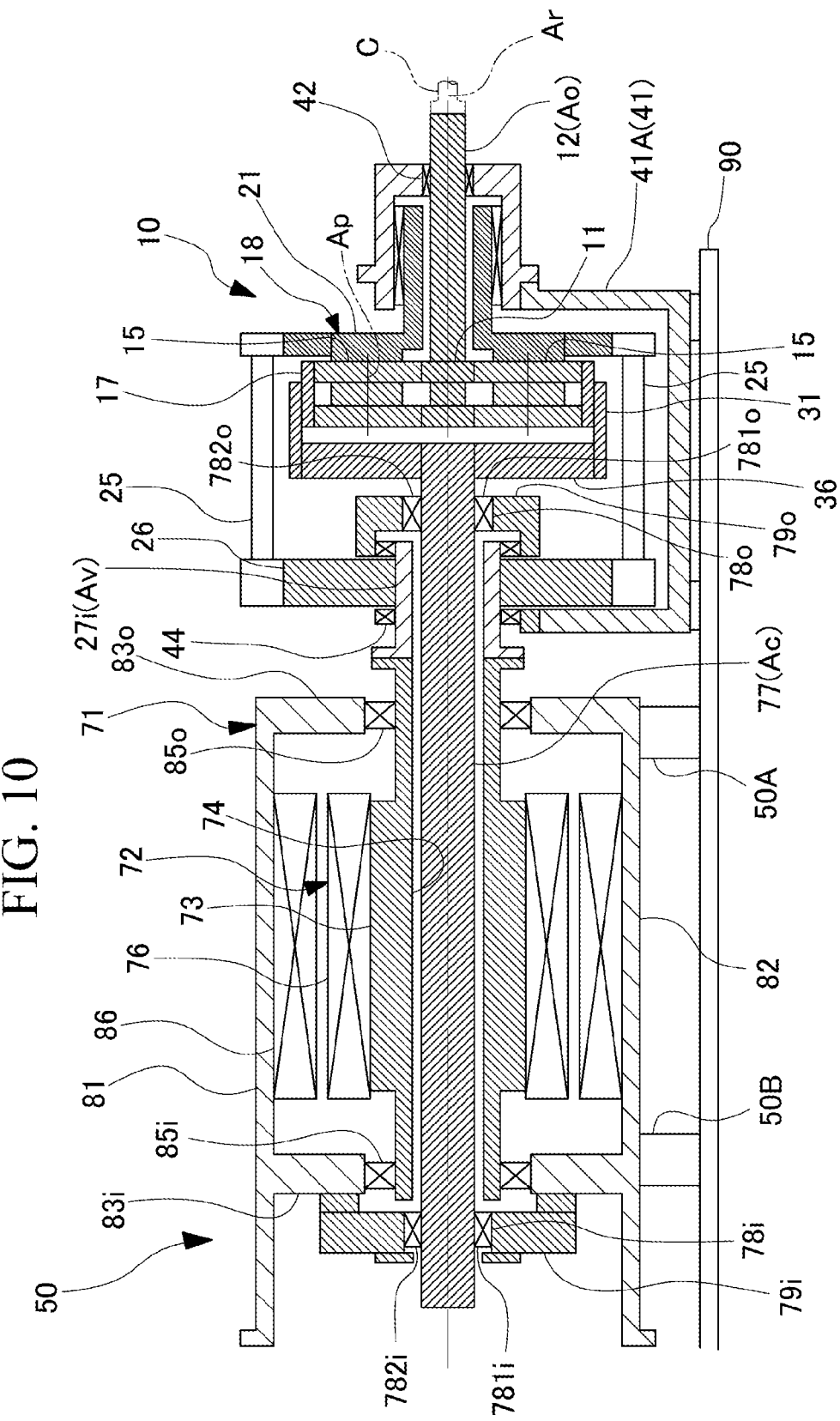
FIG. 10 is a sectional view showing a state where a planetary speed accelerator portion cassette is incorporated in the method for manufacturing a variable speed accelerator.

Thereafter, the planetary input gear 36 is attached to a first end of the constant speed shaft 77. Furthermore, as shown in FIG. 10, the planetary speed accelerator portion cassette 18 assembled with predetermined accuracy is attached to the planetary input gear 36. The planetary speed accelerator portion cassette 18 includes the sun gear 11, the sun gear shaft 12, the planetary gear 15, the internal gear 17, the planetary gear carrier 21, the internal gear carrier 31, and the transmission shaft 25 which are assembled with predetermined accuracy.

Furthermore, as shown in FIG. 1, the upper casing 41B is attached onto the lower casing 41A of the transmission casing 41. Accordingly, the assembly of the transmission device 10 is completed. Thereafter, the constant speed rotor shaft 53 is connected to the second end 77b of the constant speed shaft 77. Accordingly, the manufacturing of the electric device 50 including the variable speed electric motor 71 and the constant speed electric motor 51 and the variable speed accelerator 1 integrated with the transmission device 10 is completed.

According to the above-described method for manufacturing the variable speed accelerator 1, the constant speed shaft 77 is inserted from the horizontal direction into the shaft insertion hole 74 of the variable speed rotor 72 and the through hole 27a of the input side planetary gear carrier shaft 27i which are prepared in advance so as to extend in the horizontal direction.

Accordingly, the constant speed shaft 77 can be assembled without making the variable speed rotor 72 into a divided structure. In other words, it is possible to insert the constant speed shaft 77 into the shaft insertion hole 74 of the variable speed rotor 72 of which the alignment is adjusted without breaking the alignment of the variable speed rotor 72. Therefore, it is not necessary to perform large-scaled alignment adjustment after the constant speed shaft 77 is inserted. Accordingly, it is possible to perform the manufacturing of the variable speed accelerator 1 efficiently.

Further, by attaching the shaft jig 100 to the first end 77a of the constant speed shaft 77 and lifting only the shaft jig 100 with the lifting machine 200, the constant speed shaft 77 can be easily lifted in a horizontal state and moved in the horizontal direction regardless of the shape of the constant speed shaft 77. Accordingly, the constant speed shaft 77 can be easily inserted in the horizontal direction into the shaft insertion hole 74 of the variable speed rotor 72 and the through hole 27a of the input side planetary gear carrier shaft 27i.

In addition, in a state where first end 77a of the constant speed shaft 77 is fixed to the fixed portion 101, the center of gravity G0 at which the constant speed shaft 77 and the shaft jig 100 are aligned is positioned in an intermediate portion of the first suspension portion 104a and the second suspension portion 104b. Therefore, the constant speed shaft 77 and the shaft jig 100 can be easily held while being maintained in a horizontal state by lifting only the first suspension portion 104a and the second suspension portion 104b by the lifting machine 200.

Further, after the second end 77b of the constant speed shaft 77 inserted into the shaft insertion hole 74 of the variable speed rotor 72 is exposed from the shaft insertion hole 74, the shaft jig 100 is removed. Therefore, both ends of the constant speed shaft 77 are in a state where nothing is attached thereto in a state of being visible from the outside. Accordingly, the input side extension jig 130A can be easily attached to the end portion of the constant speed shaft 77. In addition, by supporting the constant speed shaft 77 by the lifting machine 200 via the input side extension jig 130A, it is also easy to further horizontally move the constant speed shaft 77 from a state of being inserted into the shaft insertion hole 74. In this manner, the constant speed shaft 77 can be easily inserted to the specified position of the shaft insertion hole 74 of the variable rotor.

Furthermore, after the constant speed shaft 77 is inserted into the shaft insertion hole 74, the alignment adjustment of the constant speed shaft 77 is performed. With such a configuration, the constant speed shaft 77 can be installed in the shaft insertion hole 74 of the variable speed rotor 72 prepared in advance such that the shaft insertion hole 74 extends in the horizontal direction, with higher accuracy.

In addition, in the alignment adjustment step S7, the alignment dummy shaft 150 extending in the center axis direction of the constant speed shaft 77 is attached to first end 77a of the constant speed shaft 77, and the position of the alignment dummy shaft 150 is measured. With such a configuration, even in a case where the protrusion amount from the variable speed electric motor 71 at a first end 77a of the constant speed shaft 77 is small, the alignment adjustment of the constant speed shaft 77 can be easily performed.

In addition, according to the above-described shaft jig 100, in a state where the first end 77a of the constant speed shaft 77 is fixed to the fixed portion 101, the center of gravity G0 at which the constant speed shaft 77 and the shaft jig 100 are aligned is positioned in an intermediate portion of the first suspension portion 104a and the second suspension portion 104b. The constant speed shaft 77 and the shaft jig 100 are easily held while being maintained in a horizontal state when lifting the shaft jig 100 by only the first suspension portion 104a and the second suspension portion 104b by the lifting machine 200. Therefore, the constant speed shaft 77 fixed to the shaft jig 100 can be easily inserted into the shaft insertion hole 74 by moving the constant speed shaft 77 in the horizontal direction.

(Modification Example of Embodiment)

In addition, in the above-described embodiment, the shaft jig 100 used when the constant speed shaft 77 is inserted through the shaft insertion hole 74 of the variable speed rotor 72 is exemplified. However, in a state of being attached to first end of the constant speed shaft 77, when the shaft jig 100 is in a horizontal state, the shape thereof can be appropriately changed.

Figure 11:
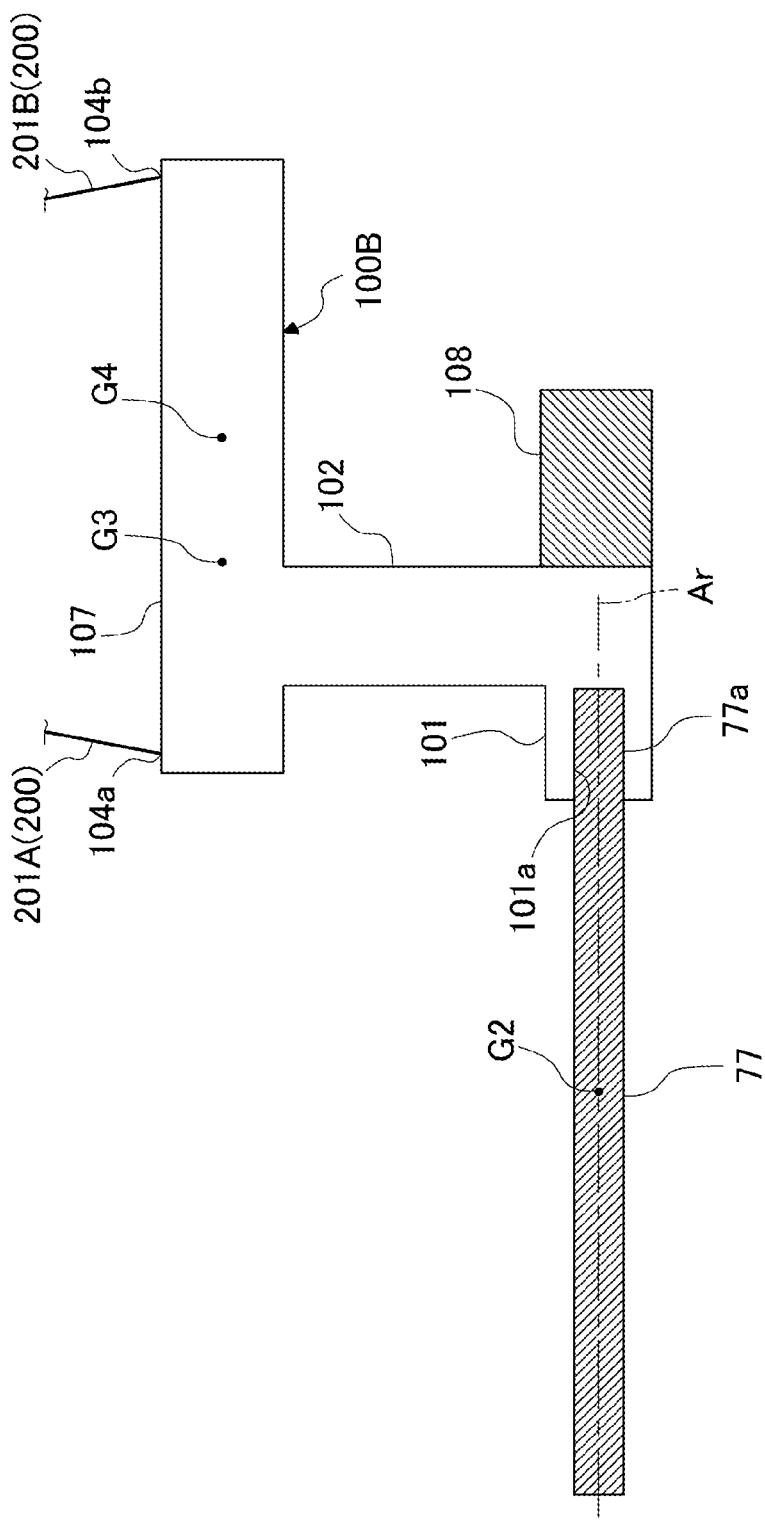
FIG. 11 is a view showing a modification example of the shaft jig.

For example, as shown in FIG. 11, a shaft jig 100B according to the modification example has a different shape of the support portion. In addition, the shaft jig 100B according to the modification example further includes a counterweight 108.

A support portion 107 of the modification example extends from the upper end of the hanging portion 102 which is above the fixed portion 101 in the hanging portion 102 in parallel with the center axis direction of the constant speed shaft 77. The support portion 107 extends from the upper end of the hanging portion 102 to both sides in the center axis direction of the constant speed shaft 77. In the center axis direction of the constant speed shaft 77, a first end of the support portion 107 extends so as not to protrude from the fixed portion 101. Meanwhile, in the center axis direction of the constant speed shaft 77, a second end of the support portion 107 extends so as to largely protrude from the hanging portion 102.

The counterweight 108 is provided on a side (a side opposite to a side on which the fixed portion 101 extends with respect to the hanging portion 102) opposite to a side on which the constant speed shaft 77 is fixed, with respect to the fixed portion 101. The counterweight 108 is attachable to and detachable from the fixed portion 101 via a member, such as a bolt.

Here, in a state where the constant speed shaft 77 is fixed to the fixed portion 101, the center of gravity of a system combining the constant speed shaft 77 and the shaft jig 100B in the center axis direction of the constant speed shaft 77 is referred to as a center of gravity G4. In addition, the center of gravity of the shaft jig 100B alone is referred to as a center of gravity G3. The center of gravity G4 is positioned on the outside of the center of gravity G2 and the center of gravity G3 in the center axis direction of the constant speed shaft 77.

The first suspension portion 104a and the second suspension portion 104b are provided on both sides of the center of gravity G4 in a state where the constant speed shaft 77 is fixed to the fixed portion 101. The first suspension portion 104a and the second suspension portion 104b are provided at equidistant positions across the center of gravity G4 in the center axis direction of the constant speed shaft 77.

With such a configuration, in the fixed portion 101 of the shaft jig 100B, the constant speed shaft 77 is fixed to one side in the center axis direction of the constant speed shaft 77 and the counterweight 108 is detachably fixed to the other side. Accordingly, by attaching the counterweight 108 having different weights to the fixed portion 101 in accordance with the weight of the constant speed shaft 77, the shaft jig 100B can be prevented from tilting even when the weight of the constant speed shaft 77 changes. In other words, it is easy to hold the constant speed shaft 77 while maintaining the horizontal state regardless of the weight. Therefore, the constant speed shaft 77 fixed to the shaft jig 100B can be easily inserted into the shaft insertion hole 74 of the variable speed rotor 72. Furthermore, the center of gravity can be adjusted by the counterweight 108, and the constant speed shaft 77 can be maintained in a horizontal state without causing the support portion 107 to largely protrude toward the side on which the constant speed shaft 77 is attached. Therefore, the work can be performed above the constant speed shaft 77 even when the shaft jig 100B is attached.

Above, although the embodiment of the invention has been described in detail with reference to the drawings, the respective configurations and combinations thereof in the each embodiment are merely examples, and additions, omissions, substitutions, and other changes of configurations are possible within the scope not departing from the gist of the invention. In addition, the invention is not limited by the embodiment, but is limited only by the claims.

For example, the configuration of each portion of the variable speed accelerator 1 can be appropriately changed. In addition, the specific work sequence of the method for manufacturing the variable speed accelerator 1 can be appropriately changed.

Further, the configuration of the transmission device 10 is not limited to the above-described gear configuration. Specifically, the gear meshing with the planetary gear 15 is not limited to the internal gear 17 as in the embodiment, and may be an external gear. Furthermore, the number of gears meshing with the planetary gear 15 is not limited to the configuration as in the embodiment. Therefore, for example, the gear meshing with the planetary gear 15 may have a configuration in which two or more internal gears 17 are provided as in the embodiment. Further, the gear meshing with the planetary gear 15 may have a configuration in which only one or three or more external gears are provided.

In addition, in the above-described embodiment, a four-pole three-phase induction electric motor is exemplified as the constant speed electric motor 51 that is appropriate for rotating the compressor at high speed, and an eight-pole three-phase induction electric motor is exemplified as the variable speed electric motor 71 that is appropriate for variably changing the rotational speed of the compressor within a certain range. However, in a case where it is not necessary to rotate the driving target at high speed, other types of electric motors may be used as the constant speed electric motor 51 or the variable speed electric motor 71.

EXPLANATION OF REFERENCES 1 variable speed accelerator
10 transmission device
11 sun gear
12 sun gear shaft
15 planetary gear
17 internal gear
18 planetary speed accelerator portion cassette
21 planetary gear carrier
25 transmission shaft
26 variable speed input gear
27$i$ input side planetary gear carrier shaft
31 internal gear carrier
36 planetary input gear
41 transmission casing
41A lower casing
41B upper casing
42 sun gear bearing
44 second planetary gear carrier bearing
50 electric device
50A first electric device support portion
50B second electric device support portion
51 constant speed electric motor
52 constant speed rotor
53 constant speed rotor shaft
56 conductor
61 constant speed electric motor casing
63$i$ input side lid
63$o$ output side lid
65$i$ constant speed rotor bearing
65$o$ constant speed rotor bearing
66 constant speed stator
71 variable speed electric motor (variable speed motor)
72 variable speed rotor
73 variable speed rotor shaft
74 shaft insertion hole (hollow portion)
76 conductor
77 constant speed shaft
77$a$ first end
77$b$ second end
78$i$ first bearing
78$o$ second bearing
79$i$ first bearing bracket
79$o$ second bearing bracket
81 variable speed electric motor casing
82 variable speed casing main body
83$i$ input side partition wall
83$o$ output side partition wall
85$i$ first variable speed rotor bearing (variable speed bearing)
85$o$ second variable speed rotor bearing (variable speed bearing)
86 variable speed stator
90 base plate
91 cooling fan
100, 100B shaft jig
101 fixed portion
101$a$ fixing hole
102 hanging portion
103, 107 support portion 104a first suspension portion (suspension portion)
104b second suspension portion (suspension portion)
108 counterweight
120 first support tool
121 second support tool
130A input side extension jig (extension jig)
150 alignment dummy shaft (extension shaft)
151 alignment jig
151h hole
200 lifting machine
201A first wire
201B second wire
201C wire
201D wire
300 dial gauge
301 dial gauge
781i first bearing lower half portion
781o second bearing lower half portion
782i first bearing upper half portion
782o second bearing upper half portion
Ac constant speed input shaft
Ao output shaft
Ap center line
Ar axis
Av variable speed input shaft
C compressor
G0 center of gravity
G1 center of gravity
G2 center of gravity
G3 center of gravity
G4 center of gravity
S1 preparation step
S2 jig connection step
S3 shaft lifting step
S4 shaft insertion step
S5 jig removal step
S6 bearing lower half portion assembly step
S7 alignment adjustment step
S8 bearing upper half portion assembly step

What is claimed is:

1. A method for manufacturing a variable speed motor and a transmission device for a variable speed accelerator comprising:
a preparation step of preparing a variable speed motor and a planetary gear transmission device,
wherein the variable speed motor includes a variable speed rotor in which a hollow portion extending in a horizontal direction is formed, a variable speed bearing that rotatably supports the variable speed rotor by aligning an axial direction of the variable speed rotor in the horizontal direction, a variable speed stator that surrounds the variable speed rotor from an outer circumferential side with respect to the variable speed rotor, and a variable speed electric motor casing in which the variable speed stator is fixed therein, and the planetary gear transmission device that has an input side planetary gear carrier shaft connected to the variable speed rotor of a variable speed electric motor, wherein the input side planetary gear carrier shaft forms a cylindrical shape; and
a shaft insertion step of inserting a constant speed shaft, which is configured to be rotatable independently with respect to the variable speed rotor and the input side planetary gear carrier shaft, into the hollow portion of the variable speed rotor and a through hole of the input side planetary gear carrier shaft in the horizontal direction so as to penetrate the variable speed rotor and the input side planetary gear carrier shaft, after the preparation step, wherein
in the preparation step, the variable speed stator and the variable speed rotor are incorporated in advance in a state where an alignment adjustment is performed, and an alignment adjustment of an output side end of the variable speed rotor is performed by adjusting a height of the variable speed electric motor casing with the input side planetary gear carrier shaft as a reference, and
the alignment adjustment is performed after a vertical positional deviation amount between the input side planetary gear carrier shaft and variable speed rotor shaft is measured by a measuring instrument.

2. The method for manufacturing a variable speed motor and a transmission device for a variable speed accelerator according to claim 1, further comprising:
a jig connection step of connecting a shaft jig to a first end of the constant speed shaft in a center axis direction, the jig connection step being performed before the shaft insertion step; and
a shaft lifting step of lifting only the shaft jig to which the constant speed shaft is connected such that the constant speed shaft and the shaft jig are in a horizontal state,
wherein, in the shaft insertion step, the constant speed shaft is inserted into the hollow portion of the variable speed rotor by moving the shaft jig in the axial direction of the variable speed rotor.

3. The method for manufacturing a variable speed motor and a transmission device for a variable speed accelerator according to claim 2,
wherein the shaft jig used in the shaft insertion step includes
a fixed portion fixed to a first end of the constant speed shaft,
a hanging portion extending from the fixed portion in a direction intersecting the center axis direction,
a support portion extending in the center axis direction of the constant speed shaft from a position spaced apart from the fixed portion in the hanging portion, and
a pair of suspension portions provided on the support portion so as to sandwich a location of a center of gravity of the shaft jig, which is fixed the constant speed shaft, in the center axis direction in a state where the constant speed shaft is fixed to the fixed portion, and
wherein, in the shaft lifting step, the shaft jig is lifted by holding only the suspension portion.

4. The method for manufacturing a variable speed motor and a transmission device for a variable speed accelerator according to claim 2, further comprising:
a jig removal step of removing the shaft jig from the constant speed shaft after the constant speed shaft is inserted into the hollow portion to a position where the second end of the constant speed shaft is exposed from the hollow portion, the jig removal step being performed after the shaft insertion step.

5. The method for manufacturing a variable speed motor and a transmission device for a variable speed accelerator according to claim 2,
wherein, in the shaft insertion step, a counterweight is detachably attached to the shaft jig on a side opposite to a side on which the constant speed shaft is fixed.

6. The method for manufacturing a variable speed motor and a transmission device for a variable speed accelerator according to claim 1, further comprising:

the alignment adjustment step of performing alignment adjustment of the constant speed shaft with respect to the variable speed rotor and the input side planetary gear carrier shaft which have been aligned, the alignment adjustment step being performed after the shaft insertion step.

7. The method for manufacturing a variable speed motor and a transmission device for a variable speed accelerator according to claim 6, wherein, in the alignment adjustment step, an extension and a position of an extension shaft, which is attached to an end portion of the constant speed shaft, extending in a center axis direction is measured.

\* \* \* \* \*